(12) United States Patent
Kim

(10) Patent No.: US 8,289,303 B2
(45) Date of Patent: Oct. 16, 2012

(54) ORGANIC LIGHT EMITTING DIODE DISPLAY

(75) Inventor: Hyeong-Gwon Kim, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 367 days.

(21) Appl. No.: 12/585,967

(22) Filed: Sep. 29, 2009

(65) Prior Publication Data
US 2010/0090998 A1    Apr. 15, 2010

(30) Foreign Application Priority Data
Oct. 15, 2008    (KR) .................. 10-2008-0101277

(51) Int. Cl.
*G06F 3/038* (2006.01)
(52) U.S. Cl. ........................................ 345/207
(58) Field of Classification Search .............. None
See application file for complete search history.

(56) References Cited

U.S. PATENT DOCUMENTS

| | | | |
|---|---|---|---|
| 6,529,212 B2 | 3/2003 | Miller et al. | |
| 7,068,263 B2 | 6/2006 | Evanicky et al. | |
| 7,397,202 B2 | 7/2008 | Sung | |
| 2004/0119104 A1* | 6/2004 | Szajewski et al. | 257/291 |
| 2005/0190142 A1 | 9/2005 | Ferguson | |
| 2006/0125387 A1* | 6/2006 | Adachi et al. | 313/506 |
| 2008/0062706 A1 | 3/2008 | Feldmeier | |
| 2008/0150883 A1 | 6/2008 | Tokuyasu | |
| 2008/0218461 A1* | 9/2008 | Sugita et al. | 345/88 |
| 2008/0248191 A1* | 10/2008 | Daniels | 427/66 |
| 2008/0266685 A1* | 10/2008 | Byers et al. | 359/838 |
| 2009/0115941 A1* | 5/2009 | Nakagawa | 349/96 |

FOREIGN PATENT DOCUMENTS

| | | |
|---|---|---|
| KR | 10-0722111 B1 | 5/2007 |
| KR | 100776498 B1 | 7/2007 |

OTHER PUBLICATIONS

Korean Office Action dated Dec. 29, 2009 corresponding to the Korean Patent Application No. 10-2008-0101277.

* cited by examiner

*Primary Examiner* — Joseph Feild
*Assistant Examiner* — Henok Heyi
(74) *Attorney, Agent, or Firm* — Robert E. Bushnell, Esq.

(57) ABSTRACT

An organic light emitting diode (OLED) display that includes a first substrate having a display area, a photo sensor arranged on a first substrate external to the display area, and a condensing lens arranged at an upper portion of the photo sensor to condense external light into the photo sensor, allowing the photo sensor to more efficiently detect an amount of external light. In this OLED display, an automatic luminance control function can be efficiently performed by increasing a condensing efficiency of the photo sensor.

13 Claims, 4 Drawing Sheets

ORGANIC LIGHT EMITTING DIODE DISPLAY

CLAIM OF PRIORITY

This application makes reference to, incorporates the same herein, and claims all benefits accruing under 35 U.S.C. §119 from an application for ORGANIC LIGHT EMITTING DIODE DISPLAY earlier filed in the Korean Intellectual Property Office on 15 Oct. 2008 and their duly assigned Ser. No. 10-2008-0101277

BACKGROUND OF THE INVENTION

1. Field of the Invention

An organic light emitting diode (OLED) display having a photo sensor that detects an amount of external light, where an automatic luminance control function can be efficiently performed by increasing a condensing efficiency of the photo sensor.

2. Description of the Related Art

Flat panel displays, such as an organic light emitting diode (OLED) display or a liquid crystal display (LCD), are recent displays. The OLED display has self-luminance characteristics, and the thickness and weight thereof can be reduced since a separate light source is not required. Further, because the OLED display has high quality characteristics such as low power consumption, high luminance, and high reaction speed, the OLED display is appropriate for use in mobile electronic devices.

The OLED display realizes a predetermined image in a display area where OLEDs are located. However, external light greatly influences display quality. Particularly, a screen contrast ratio is related to luminance of reflected light (external light reflected from the OLED display). The contrast ratio (CR) can be expressed as given in the following equation:

$$CR = 1 + (L_{self\text{-}emission} / L_{reflected\ light})$$

where $L_{self\text{-}emission}$ denotes luminance of self-emission and $L_{reflected\ light}$ denotes luminance of reflected light. As shown in the equation, the screen contrast ratio is inversely proportional to the luminance of the reflected light. Since the luminance of the reflected light is proportional to the amount of external light, the screen contrast ratio decreases when the amount of external light increases.

In order to solve this problem, an OLED display having an automatic brightness control function by using a photo sensor has been disclosed. The automatic brightness control function constantly maintains a screen contrast ratio by compensating luminance of self-emitted light according to the amount of external light by inputting an amount of external light detected by the photo sensor into a luminance controller.

The photo sensor is formed on a first substrate where OLEDs are formed, and is located external to the display area. In addition, a second substrate is bonded to the first substrate to protect the OLEDs and the photo sensor from the external environment, and a polarizing plate is attached to an external face of the second substrate for improving the screen contrast ratio.

However, when the polarizing plate covers an area where the photo sensor is formed, the transmittance of external light to the photo sensor is impaired due to the presence of the polarizing plate. This results in a decreased efficiency of the photo sensor. In addition, when the polarizing plate is attached to a display area in such a way as to not cover the photo sensor, irregular reflection can easily occur in a portion of the second substrate that corresponds to the photo sensor, so that the efficiency of the photo sensor can also be decreased.

The above information disclosed in this Background section is only for enhancement of understanding of the background of the invention and therefore it can contain information that does not form the prior art as per 35 U.S.C. 102.

SUMMARY OF THE INVENTION

The present invention has been made in an effort to provide an organic light emitting diode (OLED) display that can more efficiently perform an automatic luminance control function.

According to one aspect of the present invention, the OLED display includes a first substrate having a display area, a photo sensor arranged on the first substrate and external to the display area and a condensing lens arranged at an upper portion of the photo sensor to condense external light into the photo sensor. The OLED display can also include a second substrate fixed to the first substrate while covering the display area and the photo sensor, wherein the condensing lens is arranged on an opposite side of the second substrate than the photo sensor. The OLED display can also include a polarizing plate attached to an external face of the second substrate, wherein the condensing lens is integral with the polarizing plate. The polarizing plate can instead be spaced apart from the condensing lens.

The condensing lens can include a plurality of micro-lenses that are convex with respect to an external face of the polarizing plate. The condensing lens can be integral with the second substrate. The condensing lens can have a plurality of micro-lenses that are convex with respect to an external face of the second substrate. An area of the condensing lens can be greater than an area of the photo sensor.

According to another aspect of the present invention, the OLED display includes a first substrate having a display area, a photo sensor arranged on the first substrate external to the display area, a second substrate arranged on the first substrate and covering the display area and the photo sensor, a polarizing plate arranged on a face of the second substrate that faces away from the first substrate, the polarizing plate covering at least a portion of the second substrate that corresponds to the display area and a condensing lens arranged on the face of the second substrate that faces away from the first substrate, the condensing lens being arranged at a location that corresponds to the photo sensor.

The condensing lens can be spaced apart from the polarizing plate and can be integral with the second substrate. The condensing lens can include a plurality of micro-lenses that are convex with respect to an external face of the second substrate. Alternatively, the condensing lens can be integral with the polarizing plate. In such a scenario, the condensing lens can include a plurality of micro-lenses that are convex with respect to an external face of the polarizing plate.

BRIEF DESCRIPTION OF THE DRAWINGS

A more complete appreciation of this invention, and many of the attendant advantages thereof, will be readily apparent as the same becomes better understood by references to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art would realize, the described embodiments can be modified in various different ways, all without departing from the spirit or scope of the present invention.

Figure 1:
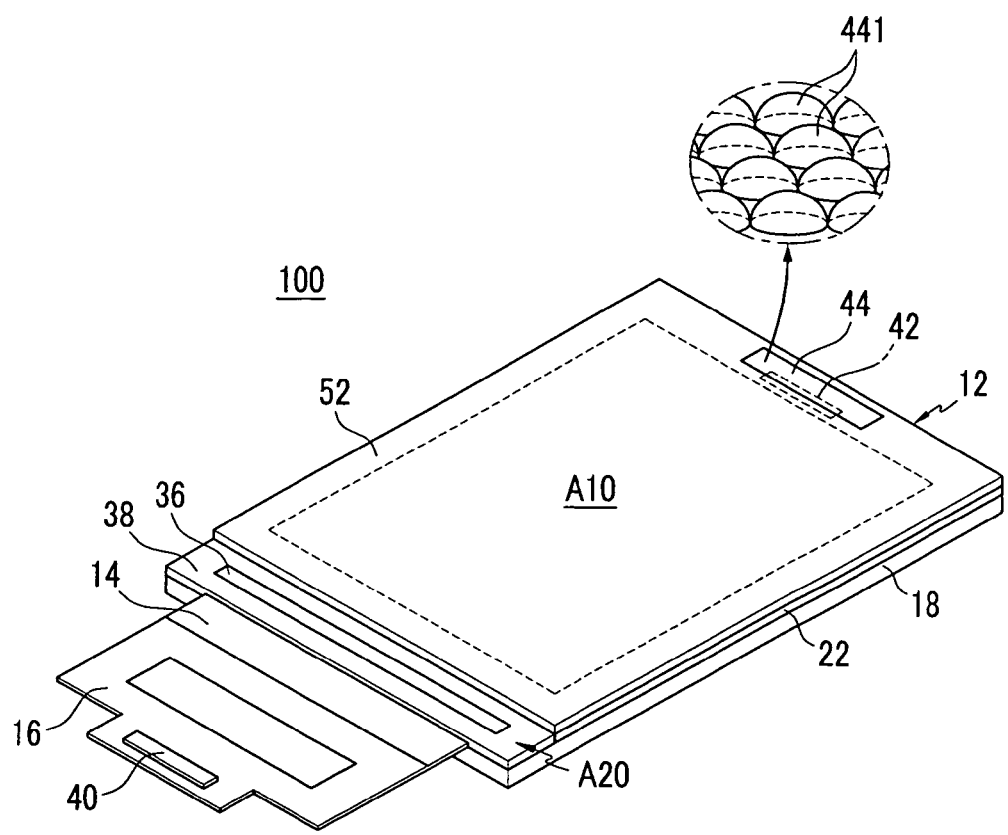
FIG. 1 is a perspective view of an organic light emitting diode (OLED) display according to a first exemplary embodiment of the present invention.
Figure 2:
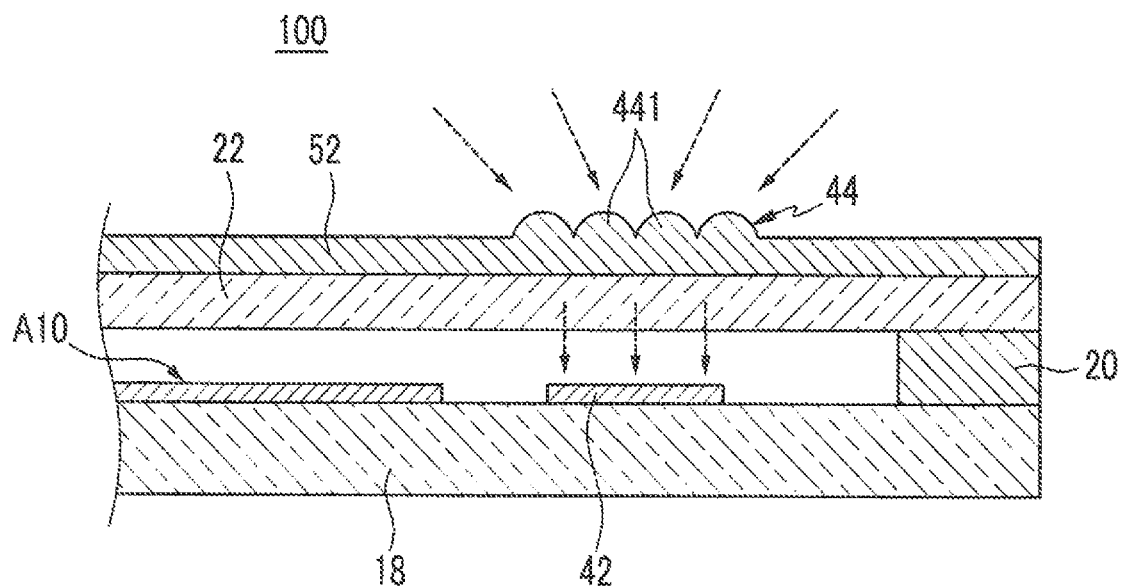
FIG. 2 is a partial cross-sectional view of the OLED display of FIG. 1.

Turning now to FIGS. 1 and 2, FIG. 1 and FIG. 2 respectively show a perspective view and a partial cross-sectional view of an organic light emitting diode (OLED) display 100 according to a first exemplary embodiment of the present invention. The organic light emitting diode (OLED) display 100 of FIGS. 1 and 2 includes a panel assembly 12, a flexible circuit board 14 fixed to a pad area A20 of panel assembly 12, and a printed circuit board 16 that is electrically connected to the panel assembly 12 through the flexible circuit board 14. The panel assembly 12 includes a display area A10 and the pad area A20, and displays a predetermined image within the display area A10.

The panel assembly 12 includes a first substrate 18 and a second substrate 22 that is smaller than the first substrate 18 and of which an edge is attached to the first substrate 18 by a sealant 20 (refer to FIG. 2). The display area A10 that substantially displays an image is located in an area where the first and second substrates 18 and 22 overlap and at an interior side of the sealant 20. The pad area A20 is located on the first substrate 18 external to the sealant 20.

A plurality of subpixels, having a matrix pattern, are arranged within the display area A10 of the first substrate 18, and a scan driver (not shown) and a data driver (not shown) drive the subpixels. The scan driver and the data driver are located either between the display area A10 and the sealant 20 or external to the sealant 20. In the pad area A20 of the first substrate 18, pad electrodes (not shown) are arranged to transmit electrical signals to the scan and data drivers.

Figure 3:
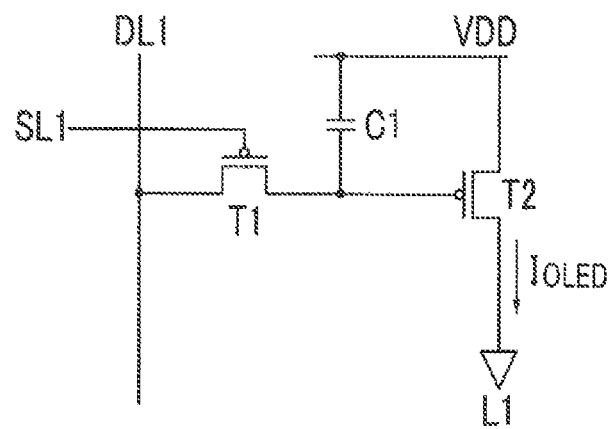
FIG. 3 is a schematic diagram of a sub-pixel circuit of a panel assembly of the OLED display of FIG. 1.
Figure 4:
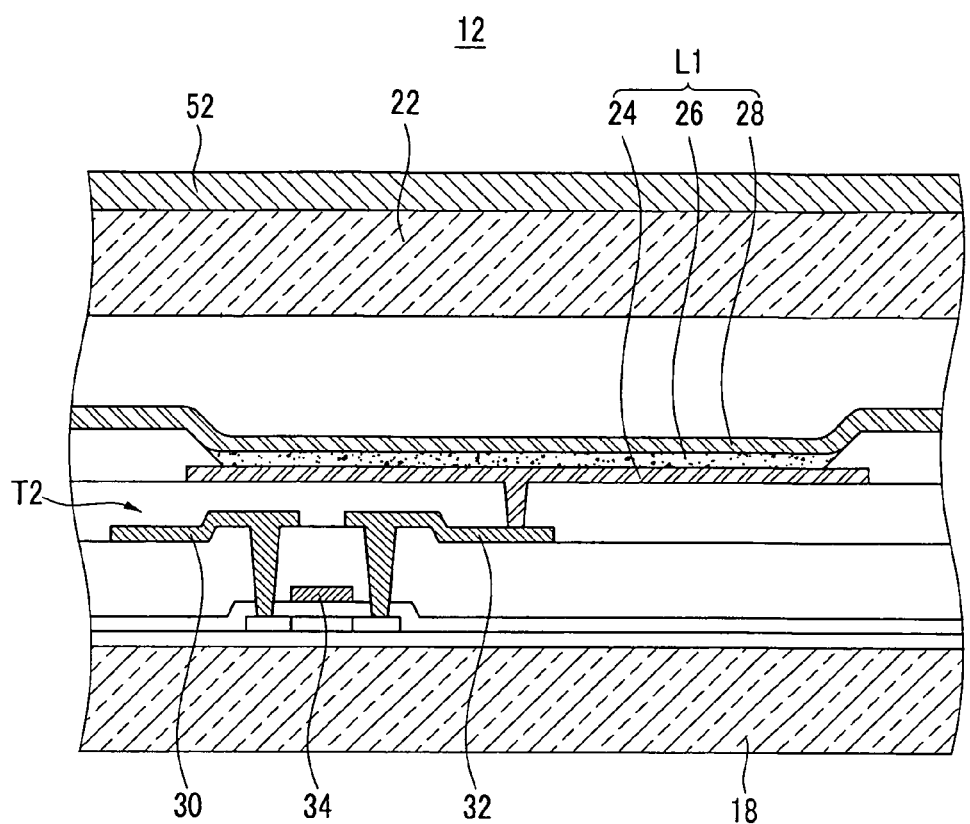
FIG. 4 is a partial enlarged cross-sectional view of the panel assembly of the OLED display of FIG. 1.

Turning now to FIGS. 3 and 4, FIG. 3 shows a subpixel circuit structure of the panel assembly of FIG. 1, and FIG. 4 is a partial enlarged cross-sectional view of the panel assembly of FIG. 1. Referring to FIGS. 3 and 4, each of the subpixels of the panel assembly 12 includes an OLED L1 and a driving circuit unit. The OLED L1 includes an anode (hole injection electrode) 24, an organic emission layer 26, and a cathode (electron injection electrode) 28. The driving circuit unit includes at least two thin film transistors (TFTs) T1 and T2 and at least one storage capacitor C1, where T1 is a switching transistor and T2 is a driving transistor.

The switching transistor T1 is connected to a scan line SL1 and a data line DL1. The switching transistor T1 transmits a data voltage input to the data line DL1 to the driving transistor T2 according to a switching voltage input to the scan line SL1. The storage capacitor C1 is connected to the switching transistor T1 and a power source line VDD. Storage capacitor C1 stores a voltage difference between a voltage transmitted from the switching transistor T1 and a voltage supplied to the power source line VDD.

The driving transistor T2 is connected to the power source line VDD and the storage capacitor C1. Driving transistor T2 supplies an output current $I_{OLED}$ to the OLED L1, the output current being proportional to the square of a voltage difference between a voltage stored in the storage capacitor C1 and a threshold voltage. OLED L1 emits light according to the output current $I_{OLED}$. The driving transistor T2 includes a source electrode 30, a drain electrode 32, and a gate electrode 34. The anode electrode 24 of the OLED L1 can be connected to the drain electrode 32 of the driving transistor T2. A configuration of the subpixel is not limited to the above-described example, and can be variously modified.

Referring back to FIGS. 1 and 2, an integrated circuit chip 36 and the flexible circuit board 14 are mounted in the pad area A20 of the panel assembly 12 by using a chip on glass (COG) method and a chip on film (COF) method, respectively. A protective layer 38 is formed around the integrated circuit chip 36 and the flexible circuit board 14 to cover pad electrodes formed in the pad area A20 for protection. In the printed circuit board 16, circuits are provided for processing driving signals, and a connector 40 is provided for transmitting an external signal to the flexible circuit board 14.

In a rear face of the panel assembly 12, a bezel (not shown) for increasing bending strength of the panel assembly 12 or a buffering tape (not shown) for increasing impact resistance of the panel assembly 12 is formed. The flexible circuit board 14 fixed to the pad area A20 is bent towards the rear of the panel assembly 12 to make the printed circuit board 16 face the rear of the panel assembly 12.

In addition, the panel assembly 12 of the present exemplary embodiment includes a photo sensor 42 that detects an amount of external light and a condensing lens 44 that is provided at an upper portion of the photo sensor 42 to condense the external light into the photo sensor 42. The photo sensor 42 is disposed on the first substrate 18 at a location external to the display area A10, generates an electrical signal that corresponds to the amount of the external light detected and transmits the electrical signal to the data driver.

Figure 5:
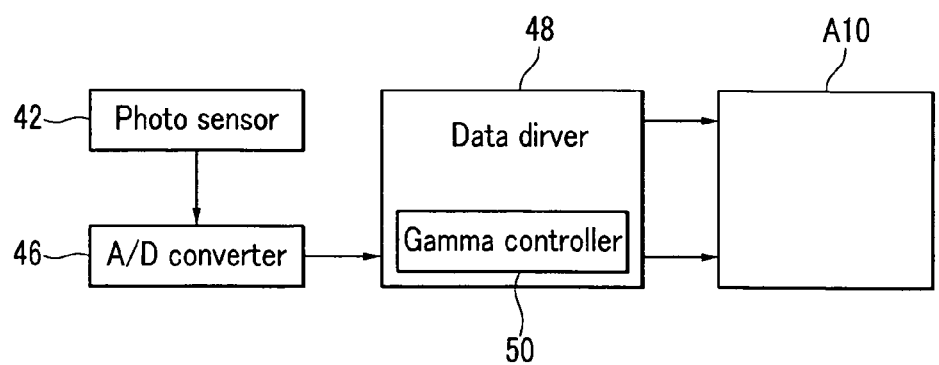
FIG. 5 is a block diagram of the OLED display of FIG. 1.

Turning now to FIG. 5, FIG. 5 is a block diagram of the OLED display according to the first exemplary embodiment of the present invention. Referring to FIG. 5, the OLED display includes the display area A10, a photo sensor 42, an analog-digital (A/D) converter 46, a data driver 48, and an OLED.

The photo sensor 42 is made up of various types of sensors that can detect an amount of surrounding light. For example, the photo sensor 42 can include at least one of a photo diode, a charge-coupled device, a charge-injected device, a photomultiplier (TM) tube, a spectro-radiometer, and a complementary metal oxide semi-conductor (CMOS) optical element. The photo sensor 42 outputs a voltage signal or a current signal that corresponds to the amount of external light detected.

The A/D converter 46 receives an analog signal of an output voltage or an output current from the photo sensor 42 and converts the analog signal into a digital signal. The A/D converter 46 can be disposed inside the data driver.

The data driver 48 provides a data voltage that appropriately corresponds to the amount of the external light impinging on the display area A10 by using the digital signal from the A/D converter 46. The data voltage output from the data driver 48 is made up of an individual data voltage of red, green, and blue. To accomplish this, the data driver 48 includes a gamma controller 50.

The gamma controller 50 includes a plurality of gamma curve levels that respectively correspond to the amount of external light detected by the photo sensor 42. The data driver 48 can control a data voltage by increasing or decreasing a data voltage provided to the display area A10 by using a data voltage setting value stored in the gamma controller 50.

With the above described configuration, the OLED display of the present exemplary embodiment can realize luminance that is appropriate for the external light according to the data voltage of the data driver, and can constantly maintain a screen contrast ratio.

Referring back to FIGS. 1 and 2, the condensing lens 44 is disposed on an external face of second substrate 22 at a location that corresponds to the photo sensor 42, and functions to increase condensing efficiency by condensing external light to the photo sensor 42. The condensing lens 44 is made up of a plurality of micro-lenses 441, and each micro-lens 441 is made up of a convex lens that is convex with respect to the external face of the OLED display 100.

In the first exemplary embodiment, a polarizing plate 52 is disposed over the entire external face of the second substrate 22, and the condensing lens 44 is integrally formed with the polarizing plate 52. The polarizing plate 52 can have a structure in which a transparent polymer film is elongated to one direction and iodine-based dye molecules are arranged in parallel with the elongated direction. The polarizing plate 52 protects the second substrate 22, improves mechanical strength of the second substrate 22, and increases a screen contrast ratio.

The condensing lens 44 can be produced by processing a region of the polarizing plate 52 corresponding to the photo sensor 42 into convex micro-lenses 441. The condensing lens 44 can be located over an area that is greater than an area where the photo sensor 42 is formed so as to increase condensing efficiency.

Each of the micro-lenses 441 that form the condensing lens 44 can be made to have various shapes such as a hemisphere shape, a polypyramid shape, and a semi-cylinder shape. FIG. 1 exemplarily shows a hemisphere-shaped micro-lens 441. In the case that the micro-lens 441 is made to have a hemisphere shape or a polypyramid shape, external light provided from front, rear, left, or right directions of the OLED display 100 can be efficiently condensed.

An output current I of the photo sensor 42 can be given as in the following equation:

$$I = C \times (dv/dt)$$

Here, C denotes capacitance of the photo sensor 42, dt denotes a condensing time, and dv denotes the amount of voltage variation.

As the condensing lens 44 condenses the external light into the photo sensor 42, the output current I of the photo sensor 42 is increased by maximizing the instant variation amount. As a result, the condensing lens 44 increases sensitivity of the photo sensor 42 and enlarges the sensitivity margin of the photo sensor 42 for sufficient operation of an automatic brightness control function.

Figure 6:
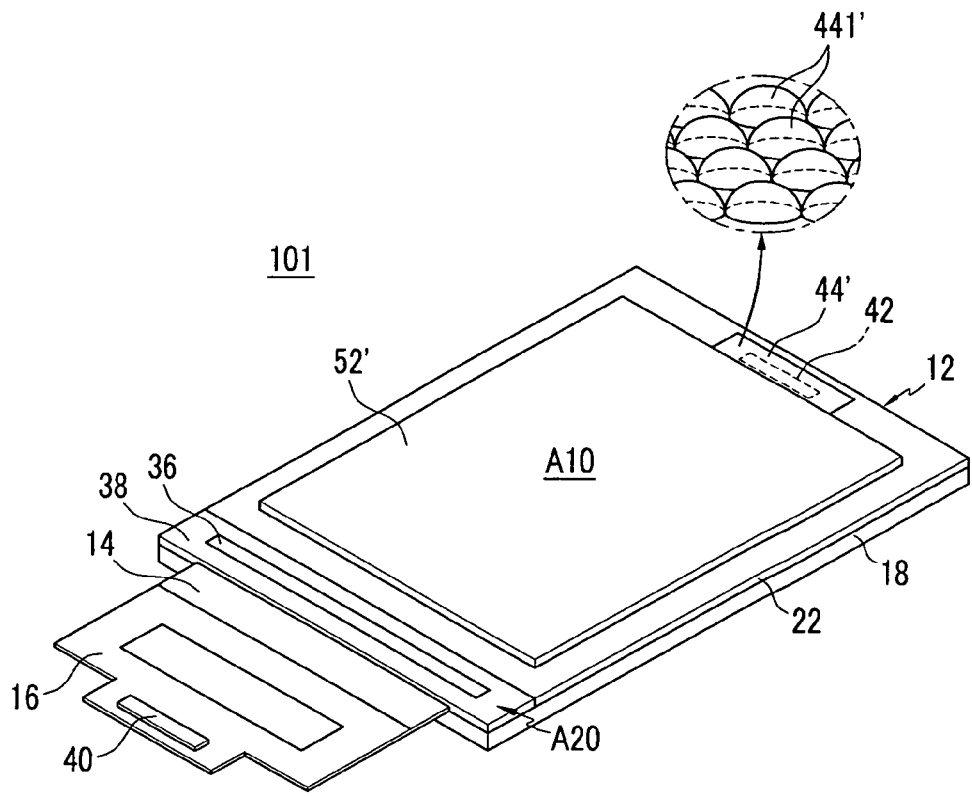
FIG. 6 is a perspective view of an OLED display according to a second exemplary embodiment of the present invention.
Figure 7:
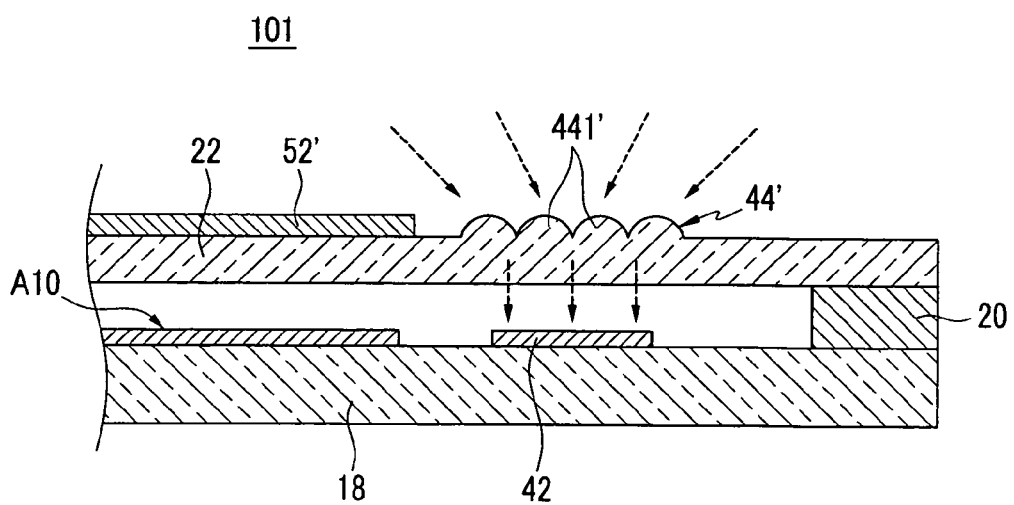
FIG. 7 is a partial cross-sectional view of the OLED display of FIG. 2.

Turning now to FIGS. 6 and 7, FIGS. 6 and 7 respectively show a perspective view and a partial cross-sectional view of an OLED display 101 according to a second exemplary embodiment of the present invention. Referring to FIGS. 6 and 7, the OLED display 101 according to the second exemplary embodiment is the same as the OLED display 100 of the first exemplary embodiment except that a condensing lens 44' is integrally formed with a second substrate 22 and the polarizing plate 52' does not overlap the condensing lens 44' but is instead spaced-apart from the condensing lens 44'. In the following description, the same reference numerals are used for the same elements as in the first exemplary embodiment.

The second substrate 22 is made out of a transparent glass substrate or a transparent polymer film, and the condensing lens 44' can be produced by processing a surface of the second substrate 22, corresponding to a photo sensor 42, to be convex. The area of the condensing lens 44' and the shape of micro-lenses 441' forming the condensing lens 44' are the same as in the first exemplary embodiment.

In the second embodiment, the polarizing plate 52' is arranged to be spaced-apart and not to be overlapped with the condensing lens 44' in order to prevent deterioration of transmittance due to the polarizing plate 52'. For example, the polarizing plate 52' can be disposed only within the display area A10 on an external face of the second substrate 22 as shown in FIG. 6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light emitting diode (OLED) display, comprising:
   a first substrate having a display area;
   a photo sensor arranged on the first substrate and external to the display area;
   a condensing lens arranged at an upper portion of the photo sensor to condense external light into the photo sensor;
   a second substrate fixed to the first substrate while covering the display area and the photo sensor, the condensing lens is arranged on an opposite side of the second substrate than the photo sensor; and
   a polarizing plate attached to an external face of the second substrate, wherein the condensing lens is integral with the polarizing plate.

2. The OLED display of claim 1, wherein the condensing lens is comprised of a plurality of micro-lenses that are convex with respect to an external face of the polarizing plate.

3. An organic light emitting diode (OLED) display, comprising:
   a first substrate having a display area;
   a photo sensor arranged on the first substrate and external to the display area;
   a condensing lens arranged at an upper portion of the photo sensor to condense external light into the photo sensor;
   a second substrate fixed to the first substrate while covering the display area and the photo sensor, the condensing lens being integral with the second substrate, the condensing lens is comprised of a plurality of micro-lenses that are convex with respect to an external face of the second substrate; and
   a polarizing plate attached to the external face of the second substrate while being spaced-apart from the condensing lens.

4. The OLED display of claim 1, wherein an area of the condensing lens is greater than an area of the photo sensor.

5. An organic light emitting diode (OLED) display, comprising:
   a first substrate having a display area;
   a plurality of organic light emitting diodes arranged within the display area;
   an automatic brightness control circuit including a photo sensor arranged on the first substrate external to the display area, the automatic brightness control circuit to maintain constant screen contrast ratio for the display by varying a luminance of light emitted by the organic light emitting diodes in the display area according to an amount of external light sensed by the photo sensor;

a second substrate arranged on the first substrate and covering the display area and the photo sensor;

a polarizing plate arranged on a face of the second substrate that faces away from the first substrate, the polarizing plate covering at least a portion of the second substrate that corresponds to the display area; and a condensing lens arranged on the face of the second substrate that faces away from the first substrate, the condensing lens being arranged at a location that corresponds to the photo sensor.

6. The OLED display of claim 5, the condensing lens being spaced-apart from the polarizing plate.

7. The OLED display of claim 5, the condensing lens being integral with the second substrate.

8. The OLED display of claim 5, the condensing lens being integral with the polarizing plate.

9. The OLED display of claim 7, the condensing lens being comprised of a plurality of micro-lenses that are convex with respect to an external face of the second substrate.

10. The OLED display of claim 8, the condensing lens being comprised of a plurality of micro-lenses that are convex with respect to an external face of the polarizing plate.

11. The OLED display of claim 5, the automatic brightness control circuit further comprising:

an A/D converter to convert an analog signal output from the photo sensor into a digital signal; and a data driver to produce a data voltage to drive the organic light emitting diodes that corresponds to an amount of external light sensed by the photo sensor by using the digital signal from the A/D converter.

12. The OLED display of claim 3, wherein an area of the condensing lens is greater than an area of the photo sensor.

13. The OLED display of claim 5, wherein an area of the condensing lens is greater than an area of the photo sensor.

* * * * *